United States Patent
Bates et al.

(10) Patent No.: US 9,465,686 B2
(45) Date of Patent: *Oct. 11, 2016

(54) DETECTING UNINITIALIZED MEMORY REFERENCES

(71) Applicant: International Business Machines Corporation, Armonk, NY (US)

(72) Inventors: Cary L. Bates, Rochester, MN (US); Lee N. Helgeson, Rochester, MN (US); Justin K. King, Rochester, MN (US); Michelle A. Schlicht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,136

(22) Filed: Feb. 10, 2015

(65) Prior Publication Data

US 2016/0232047 A1   Aug. 11, 2016

(51) Int. Cl.
  *G06F 9/45* (2006.01)
  *G06F 11/07* (2006.01)
  *G06F 12/02* (2006.01)

(52) U.S. Cl.
  CPC ........... *G06F 11/079* (2013.01); *G06F 11/073* (2013.01); *G06F 12/023* (2013.01); *G06F 2212/251* (2013.01)

(58) Field of Classification Search
  None
  See application file for complete search history.

(56) References Cited

U.S. PATENT DOCUMENTS

| 8,478,948 B2 * | 7/2013 | Panchenko ......... G06F 11/3471 711/154 |
| 2012/0303910 A1 | 11/2012 | Ma |
| 2014/0108874 A1 | 4/2014 | Rapp |

OTHER PUBLICATIONS

Bates et al., "Detecting Uninitialized Memory References", U.S. Appl. No. 15/164,974, filed May 26, 2016.
IBM, "List of IBM Patents or Patent Applications Treated as Related", May 24, 2016, 2 pages.
Bates et al., "Detecting Uninitialized Memory References," U.S. Appl. No. 14/679,423, filed Apr. 6, 2015.
IBM, "List of IBM Patents or Patent Applications Treated as Related.".

* cited by examiner

*Primary Examiner* — Chuck Kendall
(74) *Attorney, Agent, or Firm* — Feb R. Cabrasawan; Nicholas D. Bowman

(57) ABSTRACT

A pre-initialized value of contents of a memory location is identified. A load value of contents loaded from the memory location by execution of a first instruction that loads from the memory location is also identified. A comparison is made between the load value and the pre-initialized value. Based on the comparison, a determination is made that the load value and the pre-initialized value are the same. In response to this determination, it is indicated that the first instruction contains an uninitialized memory reference.

1 Claim, 11 Drawing Sheets

| Thread A | Description of Instruction(s) |
|---|---|
| ... | Various instructions. |
| STA20 11 | Store a value of 20 to memory address 11. |
| ... | Various instructions. |
| STA30 12 | Store a value of 30 to memory address 12. |
| ... | Various instructions. |

301

| Thread B | Description of Instruction(s) |
|---|---|
| ... | Various instructions. |
| LDA 11 | Load a value from memory address 11. |
| ... | Various instructions. |
| LDA 12 | Load a value from memory address 12. |
| ... | Various instructions. |

| Thread A | Description of Instruction(s) |
|---|---|
| ... | Various instructions. |
| CALL instrumentation_for_store (STA20 11) | Call to store-related instrumentation code in order to create a store record for the next store instruction. |
| STA20 11 | Store a value of 20 to memory address 11. |
| ... | Various instructions. |
| CALL instrumentation_for_store (STA30 12) | Call to store-related instrumentation code in order to create a store record for the next store instruction. |
| STA30 12 | Store a value of 30 to memory address 12. |
| ... | Various instructions. |

501

| Thread B | Description of Instruction(s) |
|---|---|
| ... | Various instructions. |
| CALL instrumentation_for_load (LDA 11) | Call to load-related instrumentation code in order to create a load record for the next load instruction. |
| LDA 11 | Load a value from memory address 11. |
| ... | Various instructions. |
| CALL instrumentation_for_load (LDA 12) | Call to load-related instrumentation code in order to create a load record for the next load instruction. |
| LDA 12 | Load a value from memory address 12. |
| ... | Various instructions. |

| Thread A | Thread B | Time(s) of Occurrence | Result of Execution of Instruction(s) |
|---|---|---|---|
| ... | ... | Time 1-15 | Various actions (e.g., loads and stores) occur for both threads. |
| CALL instrumentation_for_store (STA20 11) | | Time 16 | A store record is created in Thread A's memory access table. The store record indicates a memory address of 11, a pre-store value of 10, a store value of 20, a time of occurrence of time 16, and the pre-store value as pre-initialized. |
| | ... | Time 17-25 | Various actions (e.g., loads and stores) occur for Thread B. |
| | CALL instrumentation_for_load (LDA 11) | Time 26 | A load record is created in Thread B's memory access table. The load record indicates a memory address of 11, a load value of 10, and a time of occurrence of time 26. |
| | LDA 11 | Time 27 | A pre-initialized value of 10 is loaded from memory address 11. |
| | ... | Time 28-40 | Various actions (e.g., loads and stores) occur for Thread B. |
| STA20 11 | | Time 41 | A value of 20 is stored to memory address 11. |
| ... | ... | Time 42-55 | Various actions (e.g., loads and stores) occur for both threads. |
| CALL instrumentation_for_store (STA30 12) | | Time 56 | A store record is created in Thread A's memory access table. The store record indicates a memory address of 12, a pre-store value of 40, a store value of 30, a time of occurrence of time 56, and the pre-store value as pre-initialized. |
| STA30 12 | | Time 57 | A value of 30 is stored to memory address 12. |
| ... | ... | Time 58-65 | Various actions (e.g., loads and stores) occur for both threads. |
| | CALL instrumentation_for_load (LDA 12) | Time 66 | A load record is created in Thread B's memory access table. The load record indicates a memory address of 12, a load value of 30, and a time of occurrence of time 66. |
| | LDA 12 | Time 67 | An intialized value of 30 is loaded from memory address 12. |
| ... | ... | Time 68-80 | Various actions (e.g., loads and stores) occur for both threads. |

FIG. 7

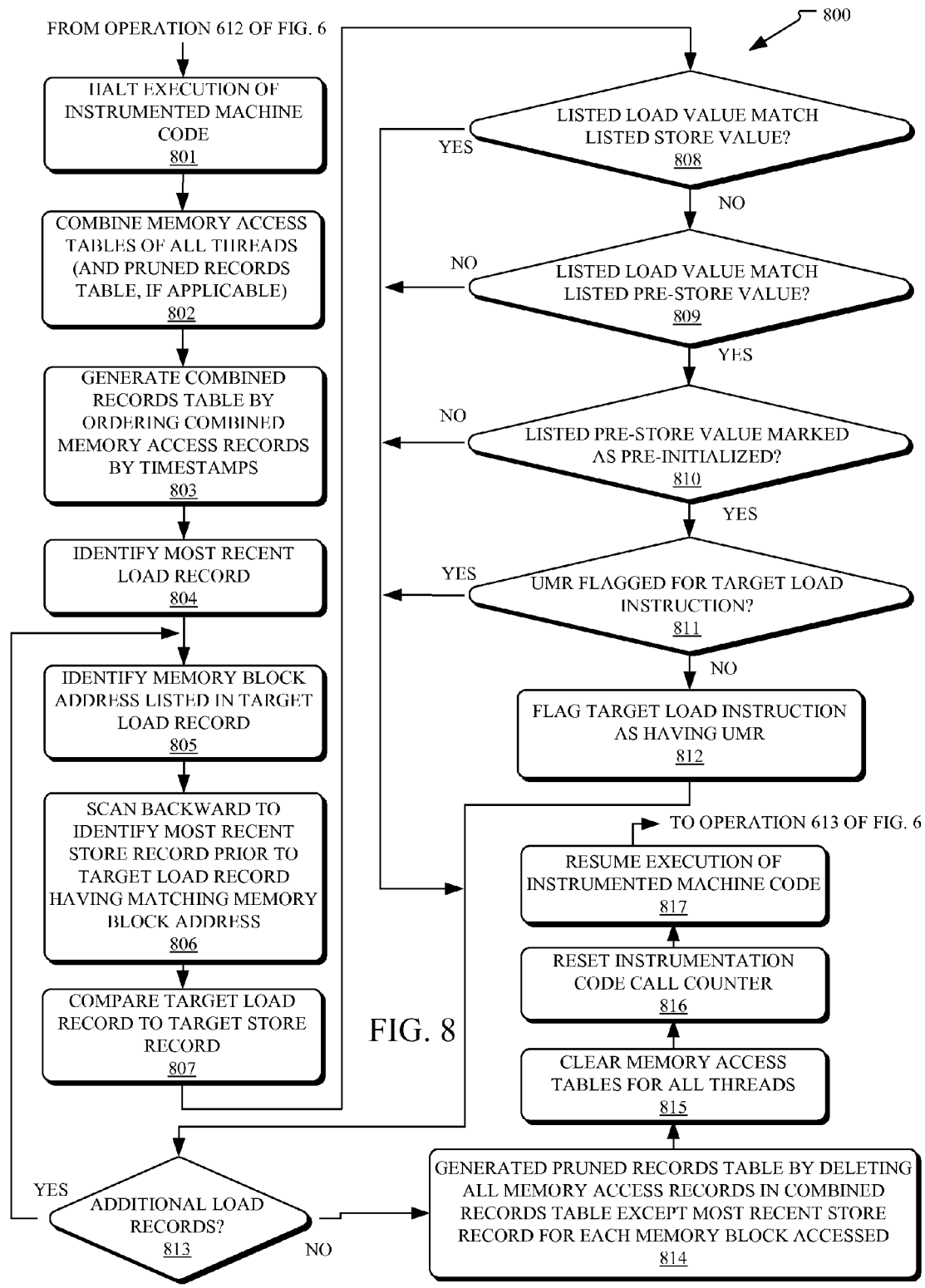

FIG. 9
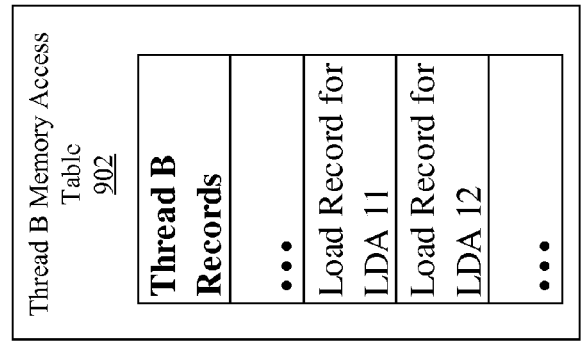
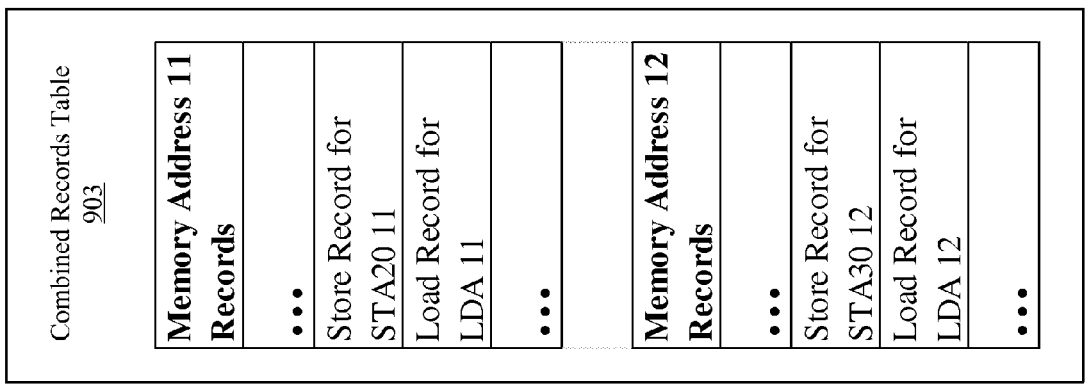
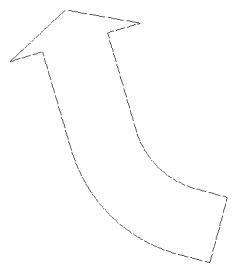
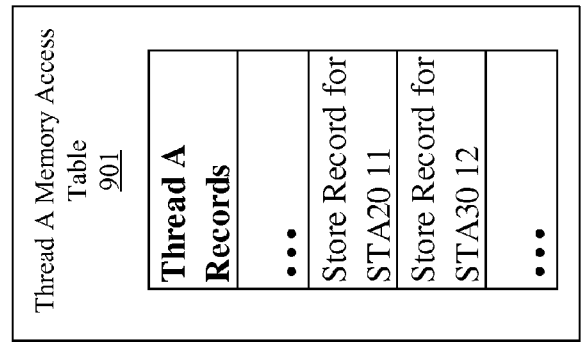

DETECTING UNINITIALIZED MEMORY REFERENCES

BACKGROUND

The present disclosure relates to data processing and, more specifically, to detecting uninitialized memory references.

Debugging is the process of finding problems, or "bugs," during the development of a computer program. Most modern programming environments include a debugger that provides tools for testing and debugging a computer program.

SUMMARY

According to embodiments of the present disclosure, aspects of the disclosure may include a method, a system, and a computer program product for detecting an uninitialized memory reference. A pre-initialized value of contents of a memory location is identified. A load value of contents loaded from the memory location by execution of a first instruction that loads from the memory location is also identified. A comparison is made between the load value and the pre-initialized value. Based on the comparison, a determination is made that the load value and the pre-initialized value are the same. In response to this determination, it is indicated that the first instruction contains an uninitialized memory reference.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

FIG. 3 illustrates two tables that provide descriptions of machine code for an example multi-threaded program undergoing debug, in accordance with embodiments of the present disclosure.

FIG. 5 illustrates two tables that provide descriptions for instructions of the example multi-threaded program referenced in FIG. 3 after the program has been instrumented, in accordance with embodiments of the present disclosure.

FIG. 7 illustrates a table that provides descriptions for the results of executing the instrumented machine code of the example multi-threaded program referenced in FIG. 5, in accordance with embodiments of the present disclosure.

FIG. 8 illustrates a flowchart of an example method for delayed flagging of uninitialized memory references, in accordance with embodiments of the present disclosure.

FIG. 9 illustrates a block diagram depicting two memory access tables, which are populated with the records created in reference to the example multithreaded program referenced in FIG. 7, being combined in order to generate a combined records table, in accordance with embodiments of the present disclosure.

Figure 1:
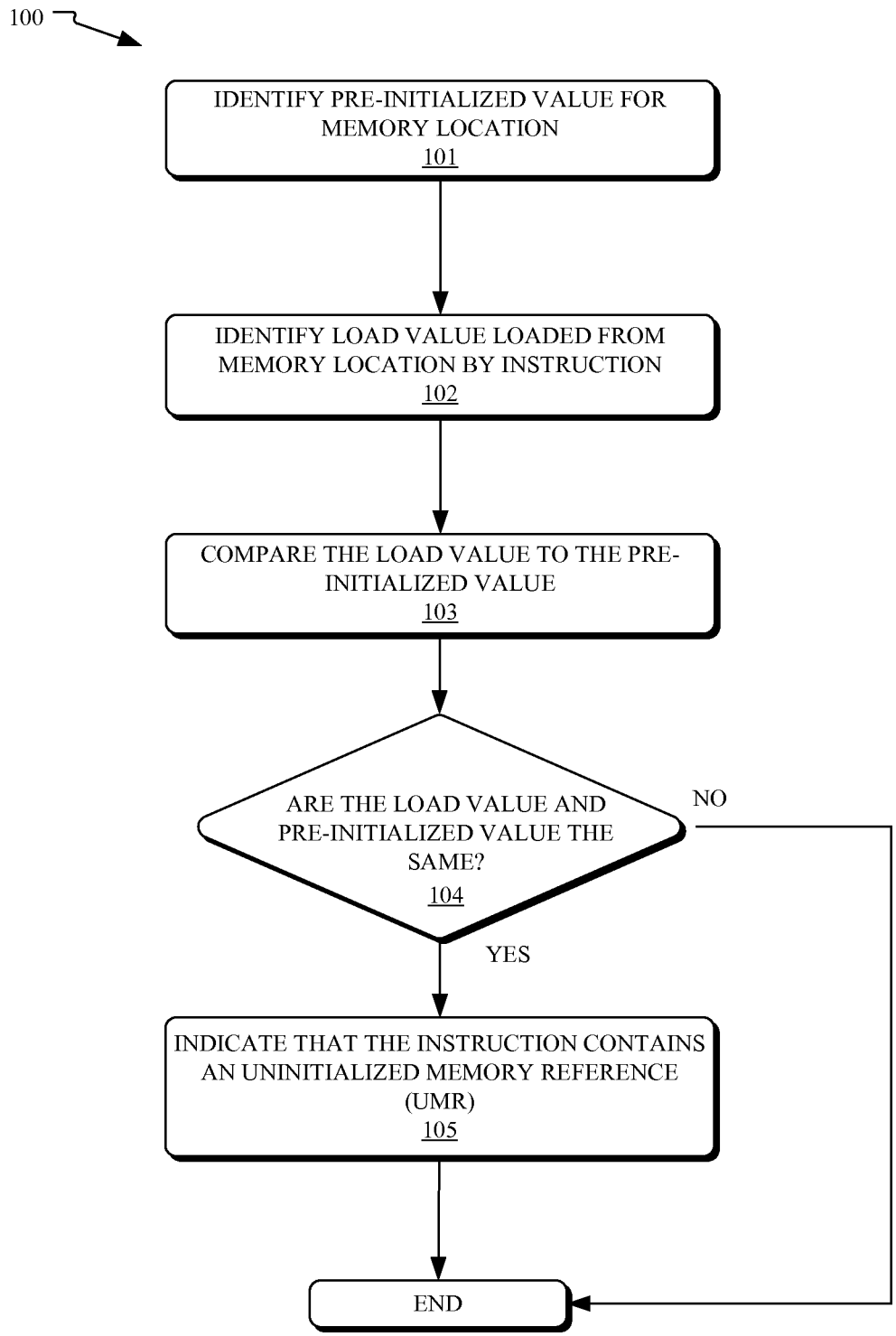
FIG. 1 illustrates a flowchart of an example method for detecting uninitialized memory references, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data processing and, more specifically, to detecting uninitialized memory references. While the present disclosure is not necessarily limited to such applications, various aspects of the disclosure may be appreciated through a discussion of various examples using this context.

A debugger or other tool may be configured to instrument a program at link time so that the debugger can detect a variety of errors in the program during its execution. These errors may include, for example, uninitialized memory references (e g, uninitialized variables), array bounds exceeded, improper uses of allocated memory, and memory leaks. In use, the debugger may instrument the target program by inserting calls to specific types of instrumentation routines at specific points within the machine code of the target program. For example, a debugger may insert calls to a store-related instrumentation code before each store instruction in the target machine code. When invoked by a call, these instrumentation routines may create records that contain certain relevant information related to one or more instructions of the target machine code. For example, in the case of the store-related instrumentation code, each time it is called it may create a store record, described elsewhere herein, that includes information related to the store instruction with which the call is associated (e.g., the information may include the memory location to which the store instruction stores).

In some situations, such a debugger may fail to detect certain uninitialized memory references due to timing window issues. Specifically, such a failure may occur in the context of a multithreaded program. For example, if a call to a store-related instrumentation code is inserted before a related store instruction in a first thread, a load instruction in a second thread may ultimately be executed after the call but before the store instruction. In this example, if the store instruction is the initializing instruction for a specific location and the load instruction loads from that location, then the load instruction can be said to contain an uninitialized memory reference (e.g., because it loads a pre-initialized value from the memory location). One problem, however, is that this uninitialized memory reference may not be detected because the load instruction occurs after the call to the store-related instrumentation code. More specifically, the debugger, relying on the record created by the store-related instrumentation code, may incorrectly presume that the store occurred before the load because the store record was created before the load occurred (or, potentially, before an associated load record was created).

On a weakly consistent system, these timing window issues may be even worse because the store instruction may drop significantly below its associated call to the store-related instrumentation code on the execution path. Furthermore, the stored value may not show up on other threads until sometime later, yet updates to the instrumentation table may be visible sooner. In some situations, the instrumentation code that updates the table to mark the memory location as initialized may be coded such that the updates to the table are available to all of the threads by the time the store instruction is actually executed. In some weakly consistent architectures, a sync instruction may be needed to bring the threads back into alignment. Thus, when the table is updated in this manner, an uninitialized memory reference may be missed when it occurs in another thread. In fact, in a weakly consistent system the same storage location may be initialized in one thread and uninitialized in another.

One potential way to overcome this timing window issue might be to insert the call to the store-related instrumentation code after (rather than before) the related store instruction. This potential solution, however, may have certain drawbacks. A first drawback is that creating the store record after executing the store instruction may create an opportunity for another thread to access the same memory location after the store instruction is executed but before the store record is created. This might result in a false positive error detection. Specifically, an uninitialized memory reference might be flagged when in fact there was no uninitialized memory reference. Another drawback to creating the store record after executing the store instruction is that if the store instruction does cause an access violation it would not be detected until afterward (e.g., until the store record is created). A third drawback is that if the store-related instrumentation code is also configured to set a watch point (e.g., to monitor changes in variables), it may be more valuable to fire the watch point (e.g., execute the instrumentation code) before the store occurs.

Referring now to FIG. 1, shown is a flowchart of an example method 100 for detecting uninitialized memory references, in accordance with embodiments of the present disclosure. In some embodiments, one or more operations of this method may be performed by a debugger during debug of a specific program. The debugger may run on a computer, such as computer 1101 depicted in FIG. 11. Per operation 101, a pre-initialized value (e.g., uninitialized value) for the contents of a specific memory location is identified. This pre-initialized value may represent a random value or other junk value of the contents of the memory location prior to initialization of the memory location within the context of the program being debugged. Per operation 102, a load value of contents that are loaded from the memory location by execution of a specific instruction is identified. In some situations, operation 102 may happen a significant amount of time before or after operation 101. In such situations, there may be a significant number of instructions that are executed and a significant number of values that are identified between operations 101 and 102. Some of these instructions and values may relate to the specific memory location. Likewise, some of these instructions and values may relate to other memory locations that are also being monitored.

Per operation 103, the load value is compared to the pre-initialized value. A determination is then made, per operation 104, as to whether the load value and the pre-initialized value are the same. If they are the same, then, per operation 105, an indication is made (e.g., in the debugging records) that the specific instruction contains an uninitialized memory reference. If, however, it is determined in operation 105 that the load value and the pre-initialized value are not the same, then no such indication is made.

Figure 2:
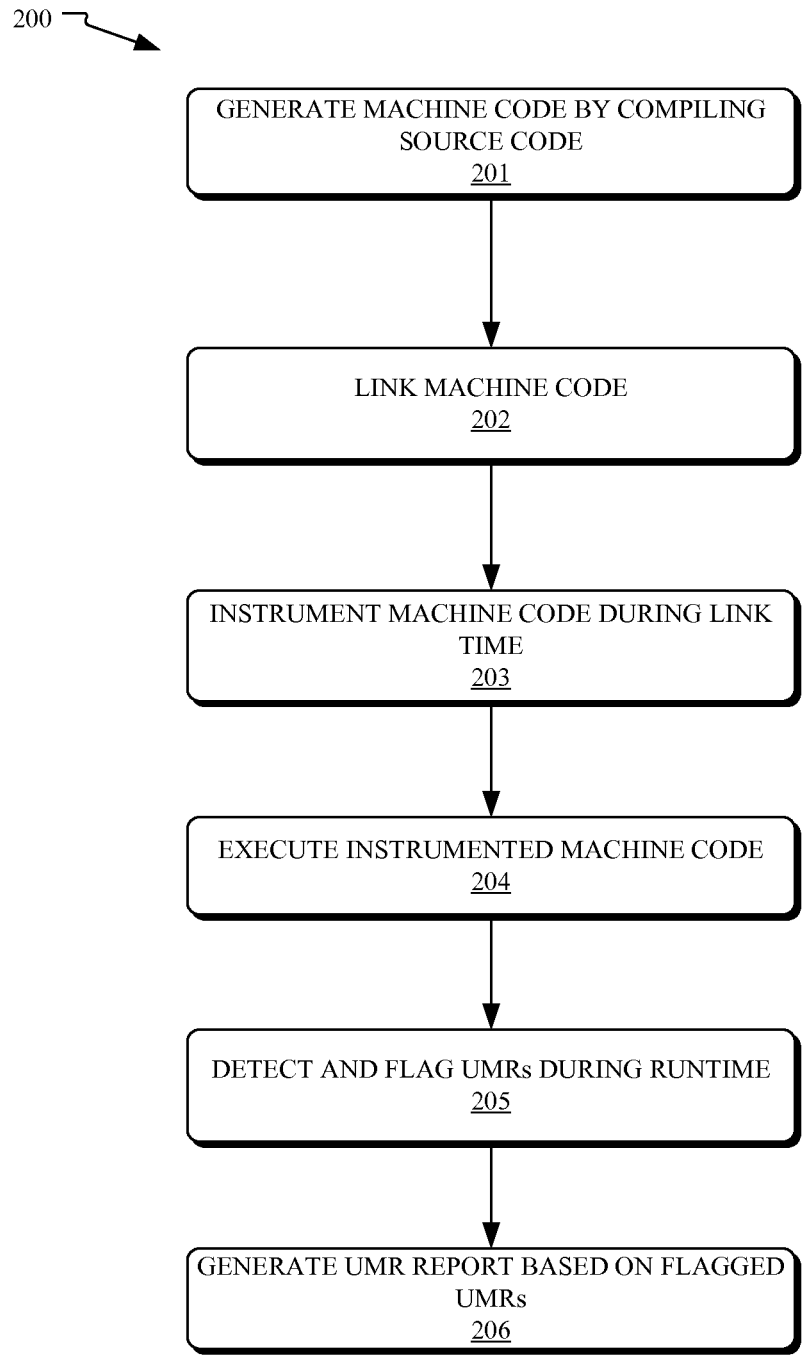
FIG. 2 illustrates a high-level flowchart of an example method for generating an uninitialized memory reference report for a specific program undergoing debug, in accordance with embodiments of the present disclosure.

Referring now to FIG. 2, shown is a high-level flowchart of an example method 200 for generating an uninitialized memory reference report for a specific program undergoing debug, in accordance with embodiments of the present disclosure. The method may begin at operation 201 with machine code for the program undergoing debug being generated by compiling the program's source code. Per operation 202, the machine code is linked. During link time, per operation 203, the machine code is instrumented. In some embodiments, instrumenting may refer to inserting specific calls or other code segments that may be helpful for monitoring the program during execution. Per operation 204, the instrumented machine code is executed. During runtime, per operation 205, uninitialized memory references may be detected and flagged. Per operation 206, an uninitialized memory reference report may be generated based on the flagged uninitialized memory references. This report may be provided to a user.

In some embodiments, object code insertion may be used to hook a target executable code in order to track loads (load records) and stores (store records) to and from one or more memory addresses. For each thread in a multithreaded target program, a list of the addresses and values that are loaded and stored may be saved (e.g., in a memory access table). For stores, values that existed in the stored location before (pre-store value) and after (store value) the store is performed may be recorded (e.g., in a store record), along with a time stamp indicating when the record was created. The pre-store value may also be flagged or otherwise marked when the location is uninitialized prior to the relevant store.

In some embodiments, the threads of the multithreaded program may be periodically halted and their lists may be retrieved. The lists may then be combined (e.g., into a combined records table) based on time stamps, and a search may be undertaken in the combined records in order to locate values in the records that are loaded from a given address but are not the most current value for that address (e.g., stale values). When a stale value is located and found to be flagged as uninitialized, a check is performed to determine if an uninitialized memory reference had been issued previously for this memory address at this location (e.g. the relevant instruction in the program being debugged). If not then a delayed uninitialized memory reference error detection notice may be signaled for this location (e.g., recorded based on the address and line of the relevant instruction).

In some embodiments, a list of memory accesses (e.g. a memory access table) is maintained separately for each thread. In some embodiments, each list may be made up of entries (e.g., store records, load records), and each entry may contain a number of fields. By maintaining these lists for each thread, the values loaded and stored within that thread can be accurately tracked. This may remain true even in weakly consistent systems, as weak consistency does not reorder loads and stores inside a single processor thread. Periodically, the program halts and holds all the threads, combines the thread lists, checks for missed uninitialized memory references, and then cleans up or otherwise pares the lists so that they do not grow unmanageably large.

In some embodiments, each load and store of the program being analyzed is instrumented using object code insertion technology. This may allow each thread to gain control of each relevant load and store and allow the debugger a chance to update its internal tables and detect errors. The debugger also updates the thread lists. Specifically, in some embodiments, before each load, an entry (e.g., load record) is created in the thread list. The entry may contain, for example, the value loaded, the memory address that the value is loaded from, the load instruction's address, and a timestamp indicating the time the entry is created. Similarly, before each store, an entry (e.g., a store record) is created in the thread list. This store record may contain, for example, the pre-store value (e.g., the value at the location stored to before the store occurs) and an indication as to whether that pre-store value is pre-initialized (e.g., whether the location is uninitialized). If the address to be stored to is not yet initialized, then a corresponding uninitialized flag may be set. In some embodiments, a similar check may also occur for load instructions in order to determine whether the load value came from an initialized location.

Next, in some embodiments, after a specific amount of time has passed or after a specific number of loads and stores have occurred, all of the threads are halted. All of the thread lists are then combined into a single list (e.g., a combined records table). This single list may be ordered by time stamp. For each loaded value included in the combined list, a scan backwards through the list may be completed to make sure the loaded value matches the last value stored at the location from which the load value was loaded. If the load value does not match that stored value, then the pre-store value associated with that stored value may also be checked to see if it matches the load value. If the load value does match the pre-store value and the pre-initialized value indicator is set for that pre-store value, then it may be concluded that the instruction that caused the load value to be loaded contained an uninitialized memory reference. A check is then made to see if the uninitialized memory reference for that instruction had been already been flagged. If it was not previously flagged, then a delayed uninitialized memory reference flag is set for the instruction.

In some embodiments, in order to prevent the combined records table from growing unmanageably large, it may be pruned from time to time. For example, during the halt in which the search for missed uninitialized memory references is undertaken, old store records and load records may be removed from the table. The individual thread lists may also be cleared. Then, during the next halt, the pruned list may be combined with the new combined records table and the process may be repeated.

Referring now to FIG. 3, shown are two tables 301 and 302 that provide descriptions of machine code for an example multi-threaded program undergoing debug, in accordance with embodiments of the present disclosure. In this example, the multi-threaded program includes a first thread (thread A) with instructions that are described in table 301 and second thread (thread B) with instructions that are described in table 302. As shown in table 301, thread A includes two instructions of interest interspersed among other various instructions. The first of these two instructions is "STA20 11" which is an instruction (e.g., a store instruction) to store a value of 20 to the memory location having the memory address of 11. The second of these two instructions is "STA30 12" which is an instruction to store a value of 30 to the memory location having the memory address of 12.

As shown in table 302, thread B also includes two instructions of interest interspersed among various other instructions. Specifically, thread B includes an instruction "LDA 11" which is an instruction (e.g., a load instruction) to load a value from the memory location having the memory address 11. Thread B also includes an instruction "LDA 12" which is an instruction to load a value from the memory location having a memory address of 12.

Figure 4:
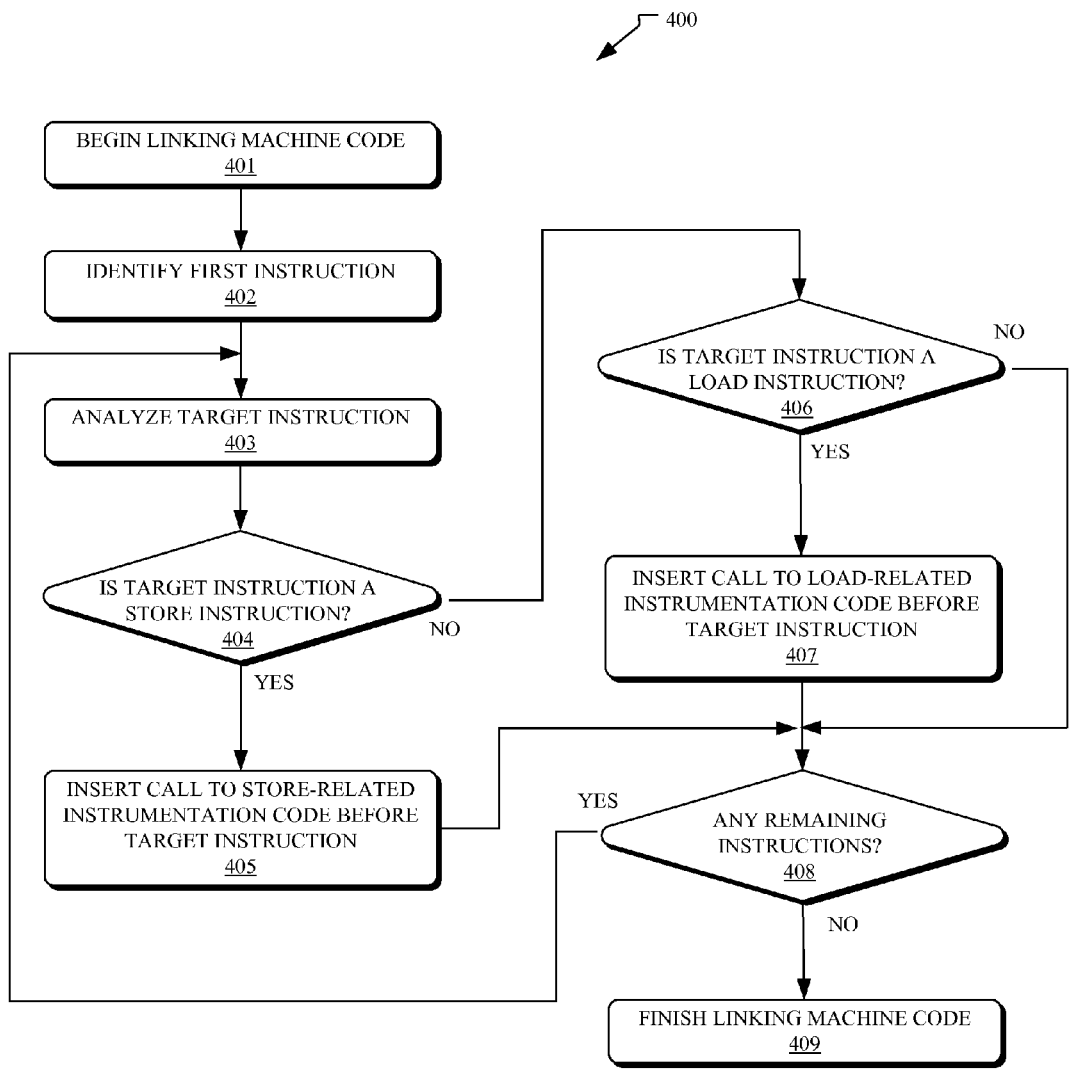
FIG. 4 illustrates a flowchart of an example method for instrumenting machine code during link time, in accordance with embodiments of the present disclosure.

Referring now to FIG. 4, shown is a flowchart of an example method 400 for instrumenting machine code during link time, in accordance with embodiments of the present disclosure. In some embodiments, one or more operations of method 400 may correspond to operation 203 of FIG. 2. Method 400 may begin at operation 401 with the beginning of linking the machine code. Per operation 402, a first instruction in the machine code to be instrumented is identified. Per operation 403, the target instruction (in this instance, the first instruction) is analyzed. Per operation 404, a determination is made as to whether the target instruction is a store instruction. If the target instruction is a store instruction then, per operation 405, a call to store-related instrumentation code is inserted before the target instruction. In some embodiments, this may be a call to a routine, subroutine, or separate debugging program.

If a determination is made in operation 404 that the target instruction is not a store instruction, then per operation 406, a determination is made as to whether the target instruction is a load instruction. If the target instruction is a load instruction, then, per operation 407, a call to a load-related instrumentation code is inserted before the target instruction. In some embodiments, this may be a call to a routine, subroutine, or program that is the same as or different from the one used for store instructions.

Once the required instrumentation (if any) of the first instruction is completed, then a determination is made per operation 408 as to whether there are any remaining instructions in the machine code to be instrumented. For each remaining instruction in the machine code, the instruction is analyzed, per operation 403, and properly instrumented, per operations 403-407. Once all of the instructions have been analyzed and instrumented as applicable, the linking of the machine code is finished, per operation 409.

Referring now to FIG. 5, shown are two tables 501 and 502 that provide descriptions of instructions of the example multi-threaded program referenced in FIG. 3 after the program has been instrumented, in accordance with embodiments of the present disclosure. The program may have been instrumented, for example, using method 400 of FIG. 4. As shown in table 501, two call instructions have been inserted in thread A of the program. Specifically, inserted immediately before the "STA20 11" instruction is an instruction of "CALL instrumentation_for_store (STA20 11)." This instruction is a call to the store-related instrumentation code in order to create a store record for the next store instruction (e.g., STA20 11). Another instruction of "CALL instrumentation_for_store (STA30 12)" is inserted before the "STA30 12" instruction. This instruction is also a call to the store-related instrumentation code and is used to create a store record for the next store instruction (e.g., STA30 12).

As shown in table 502, two call instructions have also been inserted in thread B of the program. Specifically, inserted immediately before the "LDA 11" instruction is an instruction of "CALL instrumentation_for_load (LDA 11)." This instruction is a call to the load-related instrumentation code in order to create a load record for the load instruction "LDA 11". Another instruction of "CALL instrumentation_for_load (LDA 12)" is inserted before the "LDA 12" instruction. This instruction is also a call to the load-related instrumentation code and is used to create a load record for the load instruction "LDA 12."

Figure 6:
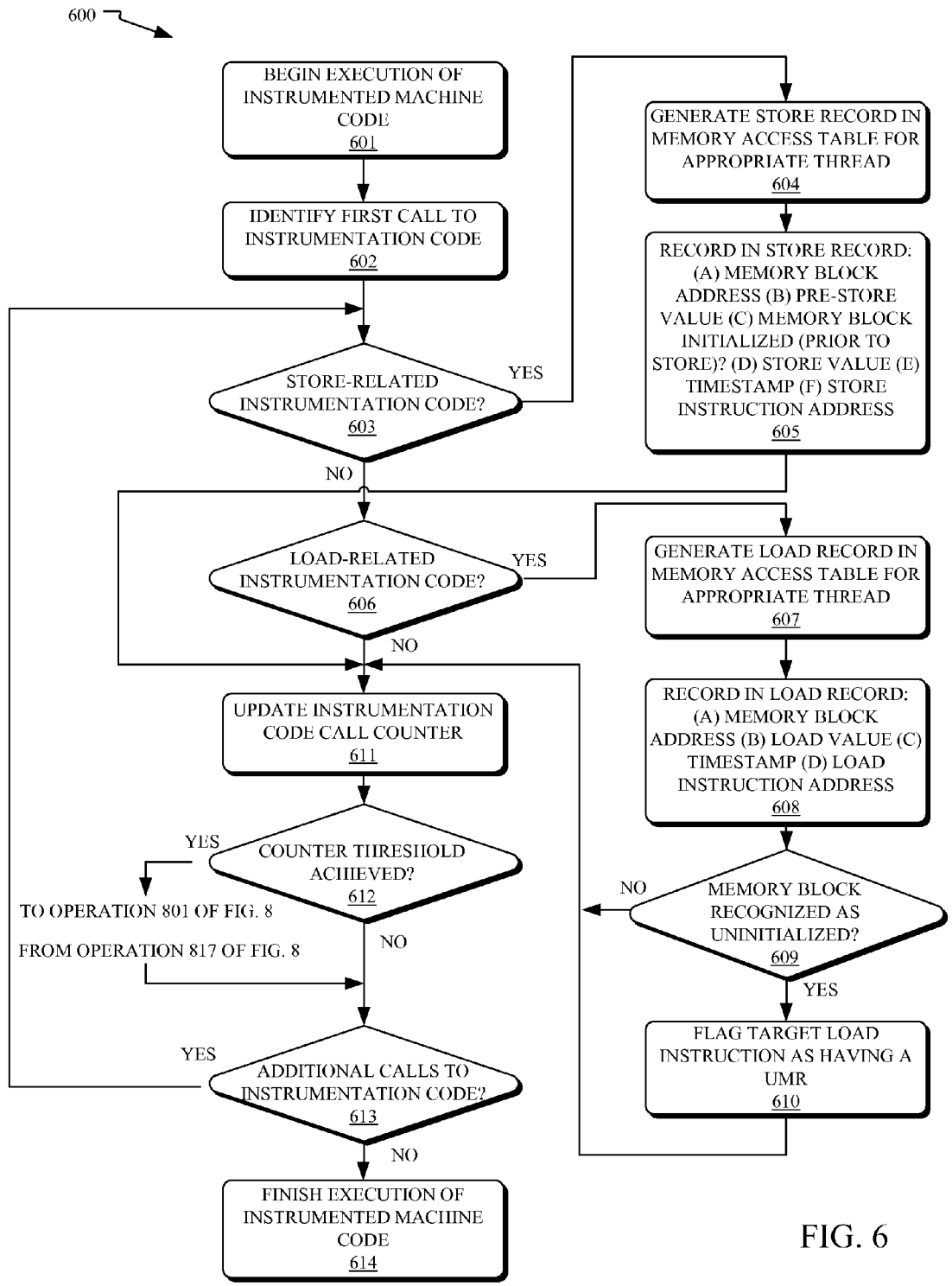
FIG. 6 illustrates a flowchart of an example method for generating memory access records during runtime, in accordance with embodiments of the present disclosure.

Referring now to FIG. 6, shown is a flowchart of an example method 600 for generating memory access records during runtime, in accordance with embodiments of the present disclosure. In some embodiments, one or more operations of method 600 may correspond to operation 205 of FIG. 2. Method 600 may start at operation 601 with beginning execution of an instrumented machine code. In some embodiments, the machine code may have been instrumented using, for example, one or more operations of method 400 of FIG. 4.

Per operation 602, a first call to instrumentation code is identified. Per operation 603, a determination is made as to whether the call is to store-related instrumentation code. If the call is to store-related instrumentation code, then, per operation 604 a store record is generated in the memory access table for the appropriate thread (e.g., the thread containing the relevant call instruction). In some embodiments, a memory access table may include specific information about all of the memory accesses for that thread within a given time period. Furthermore, a store record may refer to an entry in the memory access table that provides specific information about a specific store instruction. Per operation 605, several pieces of information may be recorded in the store record including, without limitation, a memory block address of the memory location to which the store instruction stores, a pre-store value of the contents of that memory location before the store occurs, an indication as to whether the memory location was initialized prior to the store (e.g., whether the pre-store value is a pre-initialized value), a store value of the contents stored at the memory location by the store instruction, a time stamp indicating the time that the store record is created, and an address (or other identifier) of the store instruction. In some embodiments, a store record may include any number of categories or fields of information (e.g., a store record may include only the memory block address of the relevant memory location and nothing more).

If, per operation 603, a determination is made that the first call to instrumentation code is not a call to store-related instrumentation code, then, per operation 606, a determination is made as to whether the first call to instrumentation code is a call to load-related instrumentation code. If the call is to the load-related instrumentation code, then, per operation 607, a load record is generated in the memory access table for the appropriate thread. Per operation 608, several pieces of information may be recorded in the load record including, without limitation, a memory block address of the memory location from which the load instruction loads, the load value of the contents loaded from that memory location by the load instruction, a time stamp indicating the time that the load record is created, and an address (or other identifier) of the load instruction. In some embodiments, a load record may include any number of categories of information. Per operation 609, a determination is made as to whether the memory block from which the target load instruction loads is recognized as uninitialized. If so, then, per operation 610, the target load instruction is flagged (e.g., marked, indicated) as having an uninitialized memory reference.

In some embodiments, by performing operations 609 and 610 for each call to load-related instrumentation code within the instrumented machine code, a debugger may identify and flag some (or even most) situations where uninitialized memory references occur. In other words, in some embodiments, some uninitialized memory references may be identified prior to the load records being compared to store records (e.g., as described in method 800 of FIG. 8).

Once the appropriate determinations of operations 603 and 606 have been completed for the first call to instrumentation code, and the appropriate store record or load record (if applicable) has been created, then, per operation 611, an instrumentation code call counter is updated to reflect that the first call has been encountered. In some embodiments, this counter may serve to count each time a call to instrumentation code occurs or each time a memory access record is created. Per operation 612, a determination is made as to whether a counter threshold has been achieved. This threshold may include, for example, a specific number of memory access records having been created or a specific amount of time having passed since the last halt of all of the threads. If a determination is made that the counter has achieved the threshold, then control passes to operation 801 of FIG. 8. If, however, the threshold is not achieved, or after operation 817 of FIG. 8 has been completed, then, per operation 613, a determination is made as to whether there are additional calls to instrumentation code within the instrumented machine code. If there are additional calls, then operations 603-612 are repeated, as applicable, for each call. Once all of the calls to instrumentation code have been encountered and analyzed in this manner, then the execution of the instrumented machine code is completed, per operation 614.

Referring now to FIG. 7, shown is a table 700 that provides descriptions of the results of executing the instrumented machine code of the example multi-threaded program referenced in FIG. 5, in accordance with embodiments of the present disclosure. The program may have been executed, for example, using method 600 of FIG. 6. As shown in the table 700, the significant portion of the example program has been executed and several records have been created. Specifically, beginning at time one and continuing through time fifteen, various instructions are executed and various actions, including, for example, loads and stores occur in one or both of thread A and thread B of the example multithreaded program. At time sixteen, the instruction of "CALL instrumentation_for_store (STA20 11)" is executed in thread A. As a result of the call, a store record is created in thread A's memory access table. The store record indicates that the memory location to which the value is stored has an address of 11, that the pre-store value at that location is 10, that the value stored is 20, that the time of this occurrence is 16, and that the pre-store value at that location is pre-initialized (e.g., the memory location is uninitialized prior to the store).

Continuing through table 700, at time seventeen the execution of the example program switches from thread A to thread B. From time seventeen through twenty-five, various instructions are executed in thread B. At time twenty-six, the instruction of "CALL instrumentation_for_load (LDA 11)" is executed in thread B. As a result of the call, a load record is created in thread B's memory access table. The load record indicates that the memory location from which the value is loaded has an address of 11, that the value loaded is 10, and that the time of this occurrence is 26. Next, at time twenty-seven, the instruction "LDA 11" is executed in thread B and a pre-initialized value of 10 is loaded from the location having memory address 11. Then from time twenty-eight through forty, various instructions are executed in thread B. At time forty-one, the execution of the example program switches back to thread A, and the instruction "STA20 11" is executed. This causes a value of 20 to be stored in the location having memory address 11. Next, between time forty-two and fifty-five, various instructions are executed in one or both threads.

At time fifty-six, another call instruction of interest, "CALL instrumentation_for_store (STA30 12)," is executed in thread A. As a result of this call, another store record is created in thread A's memory access table. This store record indicates that the memory location to which the relevant value is stored has an address of 12, that the pre-store value at that location is 40, that the value stored is 30, that the time of this occurrence is 56, and that the pre-store value at that location is pre-initialized. Next, at time fifty-seven, the instruction "STA30 12" is executed and a value of 30 is stored in the location having memory address 12. Between times fifty-eight and sixty-five, various instructions are executed in one or both of the threads. At time sixty-six, another load-related call instruction, "CALL instrumentation_for_load (LDA 12)," is executed in thread B. As a result of the call, another load record is created in thread B's memory access table. The load record indicates that the memory location from which the value is loaded has an address of 12, that the value loaded is 30, and that the time of this occurrence is 66. Next, at time sixty-seven, the load instruction "LDA 12" is executed in thread B and an initialized value of 30 is loaded from the location having memory address 12. Finally, from time sixty-eight to time eighty, various instructions are executed in one or both threads.

It is noted that the table 700 provides at least one example of how an uninitialized memory reference (of a type that some embodiments of the present disclosure may be configured to detect) can occur during execution of a multi-threaded program. Specifically, the load instruction "LDA 11" loads from memory address 11 prior to the initialization of that location by execution of the store instruction "STA20 11" but after the store record for that instruction has been created in response to the instruction of "Call instrumentation_for_store (STA20 11)." On the other hand, an example of a proper load (e.g., a load that is without an uninitialized memory reference) is also provided. Specifically, the load instruction "LDA 12" loads from memory address 12 after the initialization of that location by the store instruction "STA30 12."

Referring now to FIG. 8, shown is a flowchart of an example method 800 for delayed flagging of uninitialized memory references, in accordance with embodiments of the present disclosure. In some embodiments, one or more operations of method 800 may correspond to operation 205 of FIG. 2. Method 800 may start at operation 801 after a counter threshold has been achieved (per operation 612 of FIG. 6). Per operation 801, the execution of the instrumented machine code is halted. Per operation 802, the memory access tables of all threads of the multithreaded program are combined. If there is a pruned records table (described elsewhere herein) then the pruned records table is combined as well. Per operation 803, a combined records table is generated by ordering the combined memory access records by timestamps (e.g., oldest to newest or newest to oldest).

Once the combined records table is generated, then, per operation 804, the most recent (e.g., most recently created) load record is identified, for example, by finding the load record listed closest to the top of the combined records table. Per operation 805, the memory block address indicated in this target load record is identified. A scan backward is then completed, per operation 806, in order to identify the most recently created store record that both was created prior to the target load record and includes a memory address that matches the target load record memory address.

Once this target store record is identified, then, per operation 807, the target load record and target store record are compared. Based on this comparison, at least three determinations may be made. Specifically, per operation 808, a first determination is made as to whether the listed load value of the target load record matches the listed store value of the target store record. If so, then the method continues to operation 813. If, however, a determination is made that the store value and load value do not match, then, per operation 809, a second determination is made as to whether the listed load value matches the pre-store value listed in the target store record. If not, then the method continues to operation 813. If the load value does match the pre-store value, however, then, per operation, a third determination is made as to whether the listed pre-store value is indicated (e.g., marked) as pre-initialized in the target store record. If the pre-store value is not marked as pre-initialized, then the method continues to operation 813. If, however, the pre-store value is marked as a pre-initialized value, then, as a result of the three determinations of operations 808-810, the target load instruction may be deemed as containing an uninitialized memory reference.

Continuing to operation 811, after the uninitialized memory reference is identified, a check is made as to whether that uninitialized memory reference had been flagged previously. If not, then, per operation 812, a delayed flag is set to indicate that the target load instruction contains an uninitialized memory reference. After the flag is set (or after the determination is made in operation 811 that the flag was previously set), then the method 800 continues to operation 813.

In operation 813, a determination is made as to whether there are any remaining load records to be analyzed in the combined records table. If so, then for each additional load record operations 805-812 are repeated (as applicable). Once all of the load records of the combined records table have been reviewed in this manner, then a pruned records table is generated from the combined records table, per operation 814. In some embodiments, this is completed by deleting all memory access records (both store records and load records) in the combined records table except the most recently created store record for each memory block accessed. This pruned records table may then be utilized in a future iteration of method 800.

Per operation 815, the memory access tables for each thread are then cleared as well. Per operation 816, the instrumentation code call counter (referenced in operation 611 of FIG. 6) is reset (e.g., to a count of zero). Finally, per operation 817, the execution of the instrumented machine code is resumed and control is returned to operation 613 of FIG. 6.

While an example of an embodiment of method 800 is provided herein, it is contemplated that, in some embodiments, many other variants on method 800 are possible. For example, in some embodiments, if, in operation 809, a determination is made that the load value does not match the pre-store value, then a second most recent store record created prior to the target load record that is associated with the same memory block location may be identified. The store value and then the pre-store value from that second store record may be compared to the load value from the load record. This process may then be repeated continuing backward through the store records of the combined records table until a match for the load value is found in a store record. Using these additional operations, it may be possible to trace back through the records in order to identify which store instruction was actually the initializing instruction for that location and also to determine whether the pre-initialized value for that location matches the load value.

Referring now to FIG. 9, shown is a block diagram depicting two memory access tables 901 and 902 (which are populated with the records created in reference to the example multithreaded program referenced in FIG. 7) being combined in order to generate a combined records table 903, in accordance with embodiments of the present disclosure. This combination may occur, for example, using operations 801-803 of FIG. 8. As shown, the thread A memory access table 901 lists the relevant thread A memory access records, including the store record for the instruction "STA20 11" which was generated by executing the call instruction "CALL instrumentation_for_store (STA20 11)" and also including the store record for the instruction "STA30 12" which was generated by executing the call instruction "CALL instrumentation_for_store (STA30 12)." Also shown is the thread B memory access table 902. This memory access table 902 lists the relevant thread B memory access records, including the load record for the instruction "LDA 11" which was generated by executing the call instruction "CALL instrumentation_for_load (LDA 11)" and the load record for the instruction "LDA 12" which was generated by executing the call instruction "CALL instrumentation_for_load (LDA 12)".

As shown, the memory access tables 901 and 902 are joined to create a combined records table 903. In this example, the combined records table 903 has the memory access records separated into groups based on memory address and sorted within these groups based on time stamp. Specifically, the store record for "STA20 11" is grouped with the load record for "LDA 11" as well as any other records that pertain to the memory location having memory address 11. Similarly, the store record for "STA30 12" is grouped with the load record for "LDA 12" as well as any other records that pertain to the memory location having memory address 12.

Figure 10:
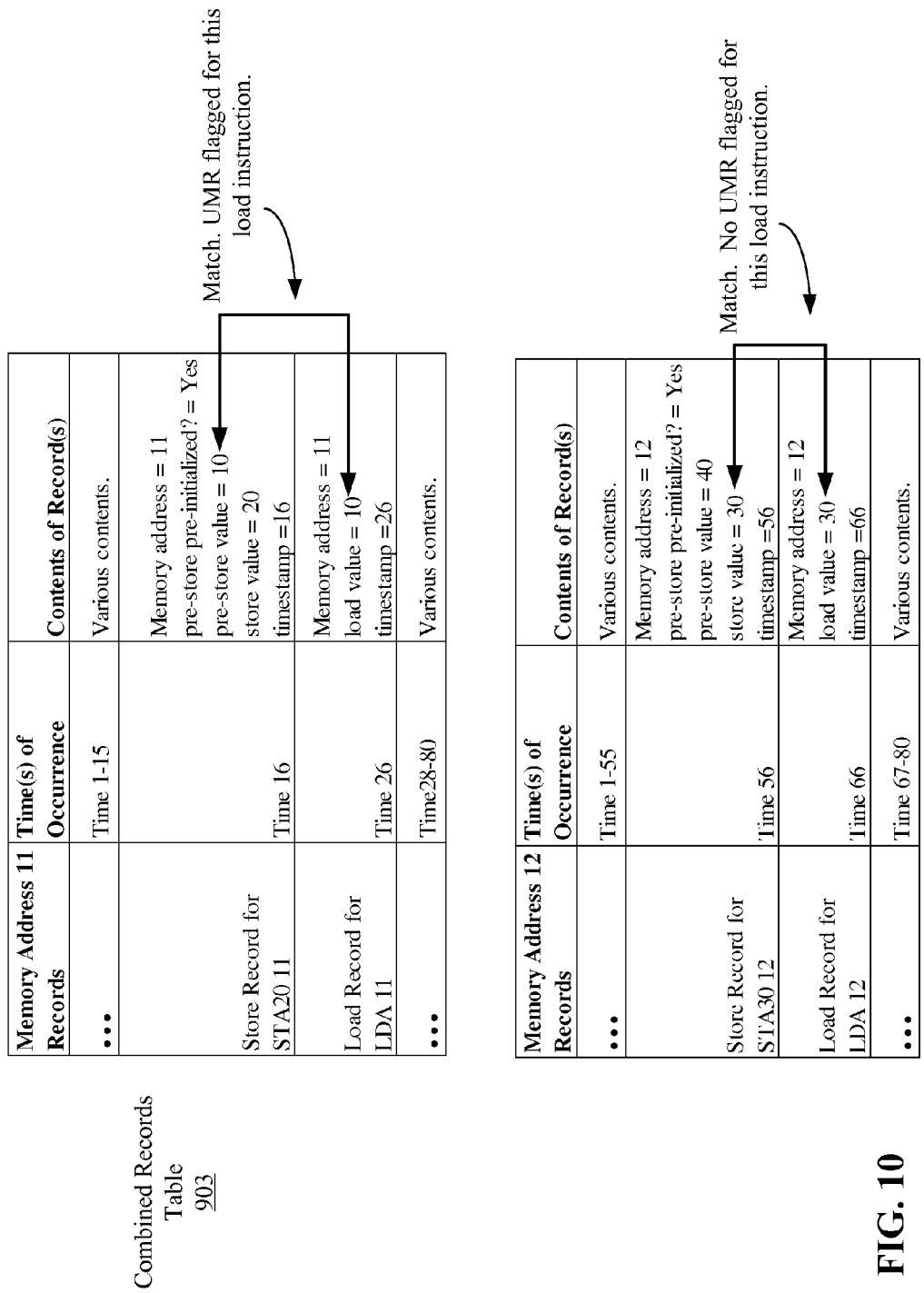
FIG. 10 illustrates a block diagram of the combined records table in FIG. 9 being analyzed in order to detect delayed uninitialized memory references in the example multithreaded program code, in accordance with embodiments of the present disclosure.

Referring now to FIG. 10, shown is a block diagram of the combined records table 903 of FIG. 9 being analyzed in order to detect delayed uninitialized memory references in the example multithreaded program code, in accordance with embodiments of the present disclosure. This analysis may occur, for example, using multiple iterations of operations 805-812 of FIG. 8. As shown, the memory access records for memory address 11 may be used to determine whether the load instruction "LDA 11" should be flagged as containing an uninitialized memory reference. Specifically, the load record for "LDA 11" (created at time twenty-six) is compared with the most recent store record that was created before the load record and references the same memory address. In this instance the store record of interest is for "STA20 11" (created at time sixteen). Once identified, the load value in the load record is compared with the store value in the store record. In this instance, this load value 10 is not the same as the store value of 20. Next, the load value is compared with the pre-store value. Here, because the load value and pre-store value are both 10 and because the pre-store value is flagged as pre-initialized in the store record, the load instruction "LDA 11" is flagged as having an uninitialized memory reference.

Also as shown in FIG. 10, a similar analysis may be carried out relating to the load instruction "LDA 12." Specifically, the load record for "LDA 12" (created at time sixty-six) is compared with the most recent store record that was created before the load record and references the memory address 12. Here, the identified store record is for "STA20 11" (created at time fifty). Once identified, the load value in the load record (30) is compared with the store value in the store record (also 30). In this instance, the load value and the store value match, and the load instruction "LDA 12" is, therefore, not flagged as having an uninitialized memory reference.

Figure 11:
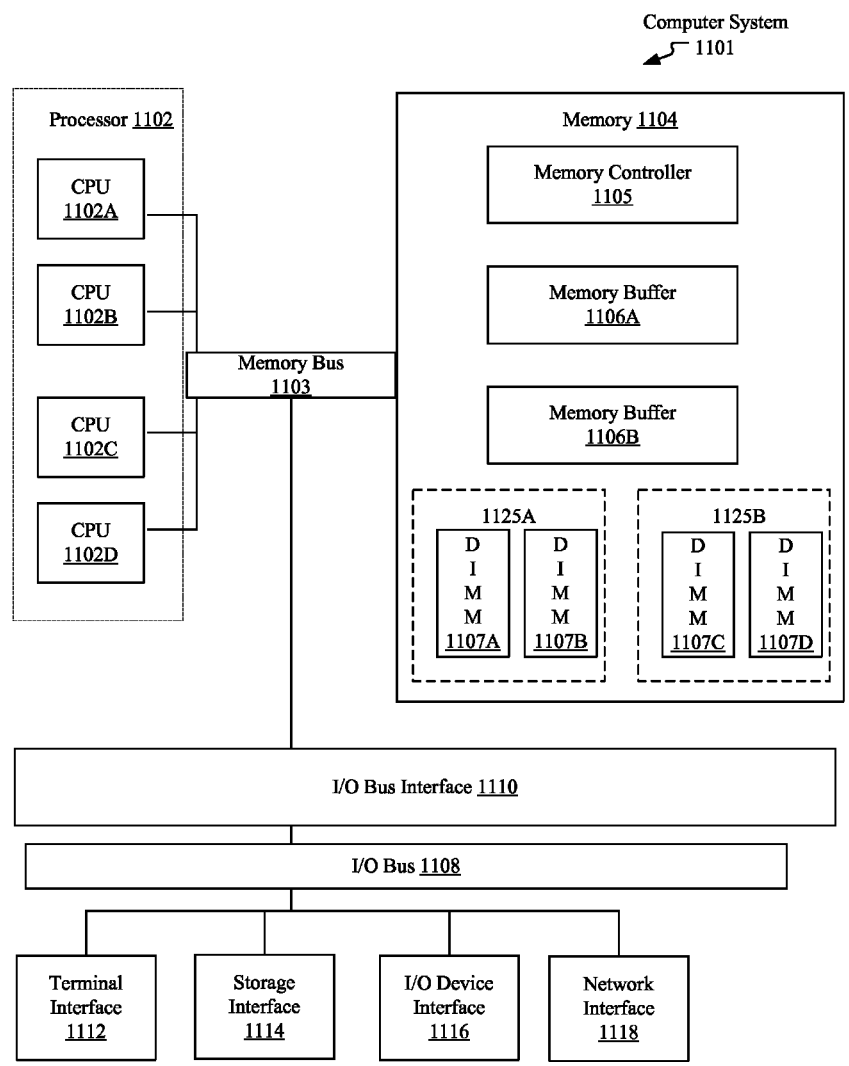
FIG. 11 illustrates a high-level block diagram of an example computer system that may be used in implementing one or more operations of the methods described herein, in accordance with embodiments of the present disclosure.

Referring now to FIG. 11, shown is a high-level block diagram of an example computer system (i.e., computer) 1101 that may be used in implementing one or more of the methods, tools, and modules, and any related functions or operations, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1114, an I/O (Input/Output) device interface 1116, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may comprise one or more levels of on-board cache.

In some embodiments, the memory subsystem 1104 may comprise a random-access semiconductor memory, storage device, or storage medium (either volatile or non-volatile) for storing data and programs. In some embodiments, the memory subsystem 1104 may represent the entire virtual memory of the computer system 1101, and may also include the virtual memory of other computer systems coupled to the computer system 1101 or connected via a network. The memory subsystem 1104 may be conceptually a single monolithic entity, but, in some embodiments, the memory subsystem 1104 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In some embodiments, the main memory or memory subsystem 1104 may contain elements for control and flow of memory used by the CPU 1102. This may include all or a portion of the following: a memory controller 1105, one or more memory buffers 1106A and 1106B and one or more memory devices 1125A and 1125B. In some embodiments, the memory devices 1125A and 1125B may be dual in-line memory modules (DIMMs), which are a series of dynamic random-access memory (DRAM) chips 1107A-1107D (collectively referred to as 1107) mounted on a printed circuit board and designed for use in personal computers, workstations, and servers. The use of DRAMs 1107 in the illustration is exemplary only and the memory array used may vary in type as previously mentioned.

Although the memory bus 1103 is shown in FIG. 11 as a single bus structure providing a direct communication path among the CPUs 1102, the memory subsystem 1104, and the I/O bus interface 1110, the memory bus 1103 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single respective units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 11 is intended to depict the representative major components of an exemplary computer system 1101. In some embodiments, however, individual components may have greater or lesser complexity than as represented in FIG. 11, components other than or in addition to those shown in FIG. 11 may be present, and the number, type, and configuration of such components may vary.

As discussed in more detail below, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for detecting an uninitialized memory reference, the system comprising:
a memory; and
at least one processor circuit in communication with the memory, wherein the at least one processor circuit is configured to perform a method comprising:
identifying a pre-initialized value of contents of a memory location, wherein the identifying the pre-initialized value of contents of the memory location comprises creating, for a second instruction that stores to the memory location, a second record that includes a pre-store value of contents of the memory location prior to execution of the second instruction, and wherein the pre-store value is the pre-initialized value;
identifying a load value of contents loaded from the memory location by execution of a first instruction that loads from the memory location, wherein the identifying the load value of contents loaded from the memory location by execution of the first instruction that loads from the memory location comprises creating, for the first instruction, a first record that includes the load value;
comparing the load value to the pre-initialized value, wherein the comparing the load value to the pre-initialized value comprises comparing the load value from the first record to the pre-store value from the second record;
determining, based on the comparing the load value to the pre-initialized value, that the load value and the pre-initialized value are the same;
indicating, in response to the determining that the load value and the pre-initialized value are the same, that the first instruction contains the uninitialized memory reference, wherein the first instruction is in a first thread of a multi-threaded program, wherein the second instruction is in a second thread of the multi-threaded program, wherein the first instruction is a load instruction, wherein the second instruction is a store instruction, wherein the first record is a load record, and wherein the second record is a store record;
generating, during an execution of the multi-threaded program and for the first thread, a first memory access table including a first plurality of load records and further including a first plurality of store records, the first plurality of load records including the load record;
generating, during the execution of the multi-threaded program and for the second thread, a second memory access table including a second plurality of load records and further including a second plurality of store records, the second plurality of store records including the store record;
combining the first memory access table and the second memory access table;
sorting, based on time of creation, the records of the combined table;
identifying the load record in the sorted table;
identifying, by scanning through the sorted table relative to the load record, a target store record of the second plurality of store records as being a most recent store record created prior to the load record that specifies the memory location, wherein the target store record is not the store record, wherein the target store record includes a target store value of contents of the memory location subsequent to execution of a target store instruction and further includes a target pre-store value of contents of the memory location prior to execution of the target store instruction, wherein the store record includes a store value of contents of the memory location subsequent to execution of the store instruction;
comparing, in response to the identifying the target store record, the load value to the target store value;
determining, in response to the comparing the load value to the target store value, that the load value and the target store value are not the same;
comparing, in response to the determining that the load value and the target store value are not the same, the load value to the target pre-store value;
determining, in response to the comparing the load value to the target pre-store value, that the load value and the target pre-store value are not the same;
identifying, by scanning through the sorted table relative to the target store record and in response to the determining that the load value and the target pre-store value are not the same, the store record as being a second-most recent store record created prior to the load record that specifies the memory location;

comparing, in response to the identifying the store record, the load value to the store value; and determining, in response to the comparing the load value to the store value, that the load value and the store value are not the same, wherein the comparing the load value to the pre-store value occurs in response to the determining that the load value and the store value are not the same.

\* \* \* \* \*